(12) United States Patent
Verschaeve et al.

(10) Patent No.: US 9,895,638 B2
(45) Date of Patent: Feb. 20, 2018

(54) FILTER FOR MOLTEN POLYMER FILTRATION

(71) Applicant: NV BEKAERT SA, Zwevegem (BE)

(72) Inventors: Frank Verschaeve, Otegem (BE); Jeremie Debaerdemaeker, Anzegem (BE)

(73) Assignee: NV BEKAERT SA, Zwevegem (BE)

( * ) Notice: Subject to any disclaimer, the term of this patent is extended or adjusted under 35 U.S.C. 154(b) by 0 days.

(21) Appl. No.: 15/115,572

(22) PCT Filed: Mar. 4, 2015

(86) PCT No.: PCT/EP2015/054499
§ 371 (c)(1),
(2) Date: Jul. 29, 2016

(87) PCT Pub. No.: WO2015/144407
PCT Pub. Date: Oct. 1, 2015

(65) Prior Publication Data
US 2017/0128866 A1 May 11, 2017

(30) Foreign Application Priority Data
Mar. 26, 2014 (EP) .................................. 14161638

(51) Int. Cl.
| | | |
|---|---|---|
| *B01D 39/10* | (2006.01) | |
| *B01D 39/20* | (2006.01) | |
| *B29C 47/68* | (2006.01) | |
| *B23K 31/02* | (2006.01) | |
| *C08G 85/00* | (2006.01) | |
| *B01D 29/39* | (2006.01) | |
| *B29K 105/00* | (2006.01) | |
| *B23K 101/22* | (2006.01) | |

(52) U.S. Cl.
CPC ......... *B01D 39/2044* (2013.01); *B01D 39/10* (2013.01); *B23K 31/02* (2013.01); *B29C 47/68* (2013.01); *C08G 85/002* (2013.01); *B01D 29/39* (2013.01); *B01D 2239/065* (2013.01); *B01D 2239/0672* (2013.01); *B01D 2239/1225* (2013.01); *B01D 2239/1233* (2013.01); *B23K 2201/22* (2013.01); *B29K 2105/0067* (2013.01)

(58) Field of Classification Search
CPC .................................................. B01D 39/2044
USPC ......................................................... 528/502
See application file for complete search history.

(56) References Cited

U.S. PATENT DOCUMENTS

| | | |
|---|---|---|
| 3,379,000 A | 4/1968 | Webber et al. |
| 3,469,297 A | 9/1969 | Webber |
| 5,665,479 A | 9/1997 | Vandamme et al. |
| 5,795,595 A | 8/1998 | Beeck et al. |

FOREIGN PATENT DOCUMENTS

| | | |
|---|---|---|
| EP | 0455492 A1 | 11/1991 |
| JP | H05-253418 A | 10/1993 |
| WO | 2004/035174 A1 | 4/2004 |
| WO | 2005/025719 A1 | 3/2005 |
| WO | 2012/004108 A1 | 1/2012 |
| WO | 2014/048738 A2 | 4/2014 |

OTHER PUBLICATIONS

International Search Report (ISR) dated Apr. 7, 2015, for PCT/EP2015/054499.
Database WPI, Week 199344, Thompson Scientific, London, GB, AN 1993347674, XP-002729619.
U.S. Office Action dated Jun. 27, 2017, for U.S. Appl. No. 15/115,549.

*Primary Examiner* — Terressa Boykin
(74) *Attorney, Agent, or Firm* — Bacon & Thomas, PLLC

(57) ABSTRACT

The filter for gel shearing and particle filtration of molten polymer has a first layer of metal fibers of an average equivalent diameter between 8 and 65 μm. The cross-section of the metal fibers has two neighboring straight sides with an included angle of less than 90° and one or more irregularly shaped curved sides. The metal fibers have an average length of at least 6 mm. The metal fibers are bonded to each other by metal bonds; where the metal of the metal fibers of the first layer is the bonding agent forming the metal bonds. The filter has a second layer of metal fibers. The average equivalent diameter of the metal fibers of the second layer is smaller than the average equivalent diameter of the metal fibers of the first layer.

16 Claims, 2 Drawing Sheets

FILTER FOR MOLTEN POLYMER FILTRATION

The invention relates to a filter for molten polymer filtration. Examples of such filters are spin pack filters, used to filter the molten polymer prior to extruding the molten polymer through a die in the production of polymer fibers; or filters used to filter molten polymer prior to the extrusion of polymer films, e.g. in the form of leaf disk filters.

BACKGROUND

In polymer extrusion, e.g. in the production of polymer fibers and films (e.g. high grade optical film) via polymer extrusion, the molten polymer is filtered before the molten polymer is passed through the extrusion die. The filter has the function of removing impurities from the molten polymer and to shear the molten polymer in order to break down the gels in the molten polymer. In polymer fiber extrusion, such a filter is called a spin pack filter.

It is known to use a layer of sand placed on a filtration membrane, as is e.g. disclosed in U.S. Pat. No. 5,795,595. The layer of sand in the spin pack filter acts to shear the molten polymer. A drawback is that preferential channels are formed in the sand, resulting in unsatisfactorily shearing. The sand can be taken along by the molten polymer and cause quality problems and/or extrusion performance problems.

Alternative spin pack filters utilize a metal powder layer to shear the molten polymer, e.g. EP0455492A1 and WO12/004108A1. Metal powder layers have the drawback of having a low porosity and hence result in a high pressure drop of the molten polymer. Furthermore, a high pressure drop enhances slip through of gels, especially soft gels, which is negative for the quality of the produced polymer product.

WO2005/025719A1 discloses a spin pack filter comprising a porous structure of sintered short metal fibers having a polygonal cross-section. The short metal fibers act to shear the molten polymer. The short fibers have a length over diameter ratio between 30 and 100. The spin pack filter may comprise different fiber layers.

JP5253418A provides a sintered filter for molten polymer filtration. The filter is provided with a first filtration fiber layer made by laminating and sintering a linear metallic fiber of polygonal cross sectional shape, made by a machining or cutting method. The second filtration fiber layer is made by laminating and sintering curved fine metallic fiber of circular cross sectional shape, made by bundled drawing. The filter comprises an intermediate metallic fiber layer (positioned between the first and the second filtration layer) made by laminating and sintering a metallic fiber of fine diameter of polygonal shape made by machining or cutting. The sintered layers are each cut to shape and put on top of each other.

The short fiber layer of WO2005/025719A1 and the linear metallic fiber layer of JP5253418A are providing shearing properties to the filter. However, the fibers used in these shear enhancing layers of WO2005/025719A1 and JP5253418A do not allow to be handled as unbonded (e.g. unsintered) web panel. Therefore, webs with these fibers can be made, e.g. on a plate, and sintered. The size required for the filter can be cut out of the sintered layer. The size required for the filter is cut out of panels for the other layers.

The layers, with the size as required for the filter or spin pack filter, are put on top of each other. It is a problem that the manufacturing process of the spin pack filter is lengthy and complex.

It is also a problem that the filters of the prior art are not providing optimum gel shearing performance.

SUMMARY OF THE INVENTION

The primary objective of the invention is to provide a filter for molten polymer filtration having improved shearing properties. It is a further objective of the invention to provide a filter with optimum shearing properties that can be manufactured in a simpler process.

A first aspect of the invention is a filter for gel shearing and particle filtration of molten polymer. The filter comprises a first layer of metal fibers of an average equivalent diameter between 8 and 65 µm. Preferably the first layer of metal fibers comprises or is a nonwoven metal fiber web. With equivalent diameter is meant the diameter of a circle that has the same surface area as the cross sectional surface area of the fiber with non-round cross section. Preferably the equivalent diameter of the fibers is between 8 and 55 µm; preferably between 8 and 50 µm, more preferably between 8 and 25 µm, even more preferably between 8 and 16 µm. The equivalent diameter of the fibers can e.g. be between 25 and 40 µm. The equivalent diameter of the fibers can e.g. be between 45 and 60 µm. The cross-section of the metal fibers of the first layer of metal fibers has two neighboring straight sides with an included angle of less than 90° and one or more irregularly shaped curved sides. The metal fibers of the first layer of metal fibers have an average length of at least 6 mm. Preferably, the metal fibers of the first layer have an average length of at least 8 mm, more preferably of at least 10 mm, and preferably less than 25 mm, more preferably less than 20 mm. The metal fibers of the first layer of metal fibers are bonded to each other by means of metal bonds, wherein the metal of the metal fibers of the first layer is the bonding agent forming the metal bonds. The filter comprises a second layer of metal fibers. Preferably the second layer of metal fibers comprises or is a nonwoven metal fiber web. The average equivalent diameter of the metal fibers of the second layer of metal fibers is smaller than the average equivalent diameter of the metal fibers of the first layer of metal fibers.

The function of the filter is to filter molten polymer in polymer extrusion, e.g. in the production of polymer films and polymer fibers. The first layer of metal fibers of the filter has the predominant function of breaking gels contained in the molten polymer by shearing them, whereas the second layer of metal fibers will basically act as a depth filter for capturing impurities from the molten polymer.

It is a benefit of the invention that a filter for molten polymer is provided that has high shearing properties in combination with a low pressure drop in polymer filtration. It is believed that the cross sectional shape of the metal fibers of the first layer of metal fibers —with its outspoken angularity—, and the predominantly two-dimensional positioning of the fibers in the first layer of metal fibers, thanks to their relatively long length, create synergistic effects resulting in the improved gel shearing.

It is a further benefit that the filter for gel shearing and particle filtration of molten polymer of the invention can be manufactured in a more simple way. The specific composition of both layers of metal fibers (the first layer of metal fibers and the second layer of metal fibers) allows that the layers can be handled, e.g. rolled and transported as an unbonded (unsintered, not welded) web. This allows putting large surfaces of the layers in web form on top of each other and sintering this large surface. This way, the porous panel of the invention can be made. From the porous panel, the surface size required for the filter (e.g. for the spin pack filter) for molten polymer filtration can be cut or punched. The number of process steps to make the filter (e.g. the spin pack filter) is drastically reduced.

In order to achieve the production of the porous panel of the invention, especially the length of the metal fibers of the first layer of metal fibers—as specified in the invention—showed to be critical.

Metal fibers having two neighboring straight sides with an included angle of less than 90° and one or more irregularly shaped curved sides can be manufactured in the way as described in WO2014/048738A2.

Preferably, the average equivalent diameter of the metal fibers of the second layer of metal fibers is between 2 and 50 µm, more preferably between 8 and 40 µm. Preferably, the metal fibers of the second layer of metal fibers have an average length of at least 6 mm. Preferably, the metal fibers of the second layer of metal fibers have an average length of at least 8 mm, more preferably of at least 10 mm, and preferably less than 25 mm, more preferably less than 20 mm.

It is also possible that the second layer of metal fibers is a multilayered web of metal fibers, with sub-layers in the multilayer of different equivalent diameter, preferably wherein the equivalent diameter of each sub-layer of the second layer is smaller than the average equivalent diameter of the metal fibers of the first layer.

In a preferred filter, the second layer of metal fibers comprises at least two sub-layers, wherein the metal fibers of at least two sub-layers differ in average equivalent diameter; wherein a sub-layer closest to the first layer of metal fibers comprises metal fibers of higher average equivalent diameter than a sub-layer further away from the first layer of metal fibers.

In a preferred filter, the first layer of metal fibers and the second layer of metal fibers are positioned one on top of the other without a physicochemical bonding between the metal fibers of the first layer of metal fibers and the metal fibers of the second layer of metal fibers.

In a preferred filter, the first layer of metal fibers and the second layer of metal fibers are bonded to each other by means of metal bonds; wherein the metal of the metal fibers of the first layer of metal fibers and of the second layer of metal fibers is the bonding agent forming the metal bonds. Such bonds can be realized by means of sintering or by means of welding, e.g. by means of capacitive discharge welding (CDW).

In a further preferred embodiment, the filter circumference is surrounded by a clamping element (e.g. out of metal, preferably out of aluminum or an aluminum alloy) sealing the sides of the filter and clamping the second layer of metal fibers onto the first layer of metal fibers.

If the filter comprises one or more, e.g. two, meshes (e.g. woven wire meshes, e.g. out of metal wires, preferably out of stainless steel wires) the one or more meshes can be integrated in the filter by means of clamping by the clamping element. If two wire meshes are present, they can e.g. be present on the two outer sides of the filter, so that one mesh is at the input side and one mesh is at the output side of the filter for the molten polymer to be filtered.

In such embodiment, preferably no metal bonds are present between the metal fibers of the first layer and the metal fibers of the second layer. However, it is also possible to use such clamping element even when the first layer of metal fibers and the second layer of metal fibers are bonded to each other by means of metal bonds.

In a preferred filter, the metal fibers of the first layer of metal fibers have a standard deviation between fibers of the equivalent fiber diameter of less than 25% of the equivalent fiber diameter. More preferably of less than 20% of the equivalent diameter, even more preferably of less than 15% of the equivalent diameter.

A more regular fiber diameter of the metal fibers of the first layer of metal fibers has a further synergistic beneficial effect on the gel shearing properties of the filter. It is believed that this effect is achieved through the different pore size distribution in the first layer of metal fibers thanks to the more regular fiber diameter. By making a cross section of the first layer of metal fibers, it can be observed that pores are more regular than when using prior art fibers with high variation in equivalent diameter. Fiber layers made with metal fibers of a same average equivalent fiber diameter but with high variation in equivalent diameter have shown to have large variation in pore sizes, and specifically a more important number of large pores have shown to be present.

In a preferred embodiment, the metal fibers of the first layer of metal fibers have an average equivalent diameter between 8 and 20 µm. A smaller equivalent fiber diameter has further synergistic effect improving the gel shearing performance of the filter. Such fibers with an average equivalent diameter between 8 and 20 µm can e.g. be made out of stainless steel alloy AISI 316 with a good uniformity of the equivalent fiber diameter.

A preferred filter comprises a first layer of metal fibers of at least 1000 g/m², more preferably of at least 2000 g/m².

A preferred filter comprises a metal wire mesh. Preferably, wherein the metal wire mesh is bonded in the filter by means of metal bonds, e.g. by means of sinter bonds or by means of welded bonds (e.g. via capacitor discharge welding). The metal wire mesh can e.g. be a woven metal wire mesh or a welded mesh. The metal wire mesh is preferably a stainless steel wire mesh, or a wire mesh out of a NiCr alloy or out of a FeCrNi alloy.

Preferred are NiCr or FeCrNi alloys with at least 40% by weight of nickel and at least 14% by weight of chromium.

As an alternative to bonding a steel wire mesh in the filter by means of metal bonds, the mesh can be integrated in the filter by means of a clamping element.

In a preferred embodiment, the cross-section of the metal fibers of the second layer of metal fibers has two neighboring straight sides with an included angle of less than 90° and one or more irregularly shaped curved sides. Although the function of the second fiber layer is predominantly capturing impurities from the molten polymer, it is a benefit of this embodiment that the second layer provides additional enhanced gel shearing properties. Preferably, the metal fibers of the second layer have a standard deviation between fibers of the equivalent fiber diameter of less than 25% of the equivalent fiber diameter. More preferably of less than 20% of the equivalent diameter, even more preferably of less than 15% of the equivalent diameter.

In a preferred filter, metal fibers of the second layer of metal fibers have a hexagonal cross section. Such fibers can be manufactured by means of bundled drawing, as is e.g. described in U.S. Pat. No. 3,379,000.

In a preferred embodiment, the porosity of the first layer of metal fibers is between 50 and 80%, preferably between 60 and 70%. Such porosity range for the first layer of metal fibers results in optimum performance, especially in terms of pressure drop and non-compressibility of the porous panel when used in a filter.

In a preferred embodiment, the porosity of the second layer of metal fibers is between 50 and 80%; preferably between 60 and 70%. Such porosity range for the second layer of metal fibers results in optimum performance, especially in terms of pressure drop and non-compressibility of the porous panel when used in a filter.

Any type of stainless steel alloy can be used for the metal fibers of the first layer and/or for the second layer of metal fibers of the filter, e.g. stainless steel fibers from AISI 300 or AISI 400-series alloys or alloys comprising iron, aluminum and chromium. Stainless steel comprising chromium, aluminum and/or nickel and 0.05 to 0.3 percent by weight of yttrium, cerium, lanthanum, hafnium or titanium (known as Fecralloy®), can be used.

Examples of stainless steel alloys that can be used are AISI 316 and AISI 304. It is also possible to use NiCr alloy fibers and/or FeCrNi alloy fibers as metal fibers in the first layer of metal fibers and/or in the second layer of metal fibers. Preferred are NiCr or FeCrNi alloys that comprise at least 40% by weight of nickel and at least 14% by weight of chromium. An example of a suitable FeNiCr alloy for the metal fibers is UNSN06601, and/or its equivalent designation 2.4851 according to EN10088-1:2005: this alloy has a nickel content between 58 and 63% by weight and a chromium content between 21.0 and 25.0% by weight. An example of a suitable NiCr alloy is UNS N06686 comprising 21% by weight of chromium, 16.3% by weight of molybdenum, 3.9% of tungsten and the balance nickel.

For use in the invention, any type of combination can be made of metal fibers for the first layer of metal fibers and of metal fibers for the second layer of metal fibers, e.g. out of the alloys mentioned. Preferred however is when the metal fibers of the first layer of metal fibers and the metal fibers of the second layer of metal fibers are out of the same alloy composition.

In a particularly beneficial filter, the first layer of metal fibers is built up by superimposing a number of metal fiber webs. E.g. 2-8, e.g. 5 or 6 webs can be superimposed on top of each other. Such a process results in a filter with a first layer of metal fibers comprising metal fibers that have a more two-dimensional orientation in the plane of the filter, believed to contribute to the improved shearing performance of the filter.

A second aspect of the invention is a spin pack filter comprising a filter as in the first aspect of the invention.

A third aspect of the invention is a leafdisk filter comprising a filter as in the first aspect of the invention. Such a leafdisk filter can e.g. be used in the extrusion of polymer films.

Preferably, in the leaf disk filter, the first layer of metal fibers and the second layer of metal fibers of the filter are bonded to each other by means of metal bonds; whereby the metal of the metal fibers of the first layer of metal fibers and of the second layer of metal fibers is the bonding agent forming the metal bonds. Such bonds can e.g. be sinter bonds or welded bonds, e.g. using capacitive discharge welding (CDW). In a further preferred leaf disk, wire meshes, e.g. woven wire meshes, are provided, e.g. bonded, on both sides of the leaf disk filter. This bonding can preferably be done via sinter bonds or via welded bonds, e.g. using capacitive discharge welding (CDW).

A fourth aspect of the invention is a method for filtering molten polymer in polymer extrusion, wherein a filter is used as in the first aspect of the invention; or wherein a spin pack filter is used as in the second aspect of the invention; or wherein a leafdisk filter is used as in the third aspect of the invention; for breaking gels and for removing particles and/or impurities from the molten polymer via filtration.

DETAILED DESCRIPTION OF THE INVENTION

Figure 1:
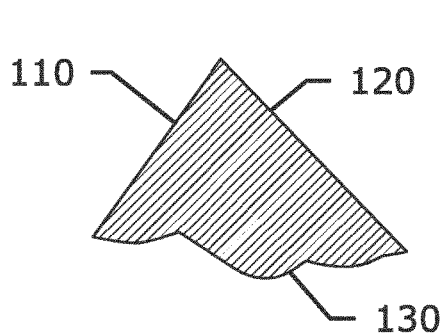
FIGS. 1-6 show examples of fiber cross sections of metal fibers that can be used for the first layer of metal fibers of the filter.
Figure 2:
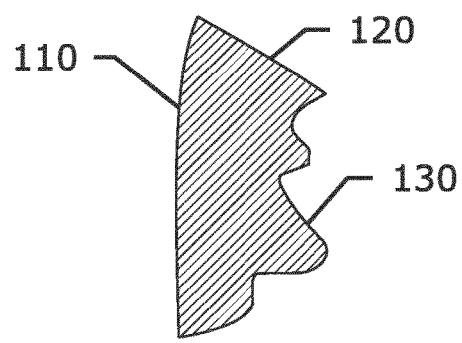
Figure 3:
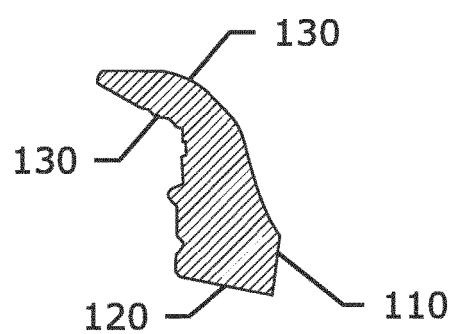
Figure 4:
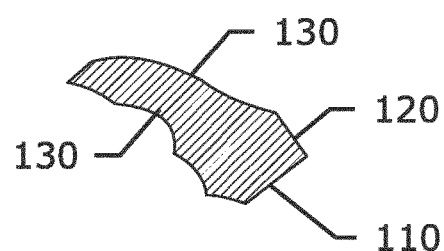
Figure 5:
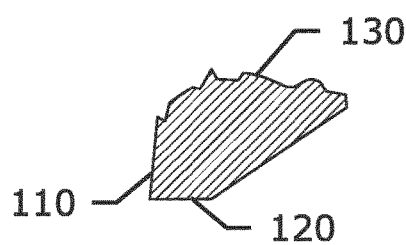
Figure 6:
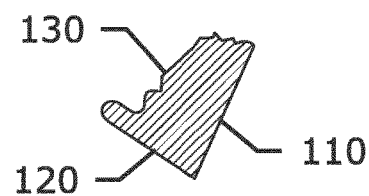

FIGS. 1-6 show examples of fiber cross sections of metal fibers—e.g. stainless steel fibers—that can be used for the first layer of metal fibers of the filter. The fiber cross sections are having two neighboring straight lined sides 110, 120 with an included angle of less than 90° and one or more irregularly shaped curved sides 130. Metal fibers having such cross-sections can also be used in the second layer of metal fibers. Such fibers can be made according to the method described in WO2014/048738A2. Such fibers for the first layer (and for embodiments of the second layer)—fibers that have a cross-section that has two neighboring straight sides with an included angle of less than 90° and one or more irregularly shaped curved sides—can be made according to the method comprising the steps of:

fixing on a lathe a metal piece (or work piece), for instance an ingot, from which the metal fibers will be cut;

mounting a tool on a tool holder and sliding the tool holder with a feed rate along the axis of the lathe;

imposing a vibration upon the tool thereby cutting metal fibers from the metal piece;

measuring the rotational speed of the lathe and using the measurement signal in order to dynamically synchronize (preferably steer and synchronize) the vibration frequency of the tool with the rotational speed of the lathe by means of an electronic control circuit.

The vibration of the tool can be obtained by means of a piezomotor, the frequency of which is controlled. This method results in metal fibers with a cross-section having two neighboring straight sides with an included angle of less than 90° and one or more irregularly shaped curved sides. This follows from the way the tool cuts fibers out of the work piece. A previous cut formed two straight lines, during cutting the fiber, the first will be deformed in an irregularly shaped curve the second stays straight and forms an included angle of less than 90° with a newly formed straight edge. The latter is formed by the cutting action on the cutting plane of the knife. The one or more irregularly shaped curved sides are formed by upsetting/bulging of a side not in contact with the cutting tool during the cutting process, by the compressive forces in the material being cut.

This way, metal fibers can be made that have a low standard deviation between fibers of the equivalent fiber diameter. Fibers of discrete length are produced by exiting the cutting tool each vibration cycle out of the tool. This way of working has the benefit that fibers with low variation in length can be produced.

Preferably, a ball bearing, and more preferably a pretensioned ball bearing, is used to slide the tool holder along the axis of the lathe. This feature further ensures low variation between fibers of the equivalent diameter of the fibers.

Alternatively, the sliding of the tool holder along the axis of the lathe is realized by means of a direct drive by means of a linear motor, meaning that no reduction of motor speed nor clutch is required. Such a method contributes to the production of metal fibers with low variation.

Preferably, the tool holder set up and/or tool mounting is such that displacement of the tool due to bending of the tool holder during fiber cutting is less than 5 µm, preferably less than 2 µm. This feature improves the uniformity of the equivalent diameter of the fibers that are cut. More preferably, the tool holder and/or the tool is supported in order to minimize or prevent bending of the tool holder due to the cutting forces. Preferably, the tool holder and/or the tool is supported by a mechanical support, preferably the mechanical support is connected to the block onto which the tool holder is mounted. The tool and/or the tool holder can e.g. vibrate in a bush. This way, it is possible to obtain metal fibers with even lower variation between fibers of the equivalent fiber diameter.

Figure 7:
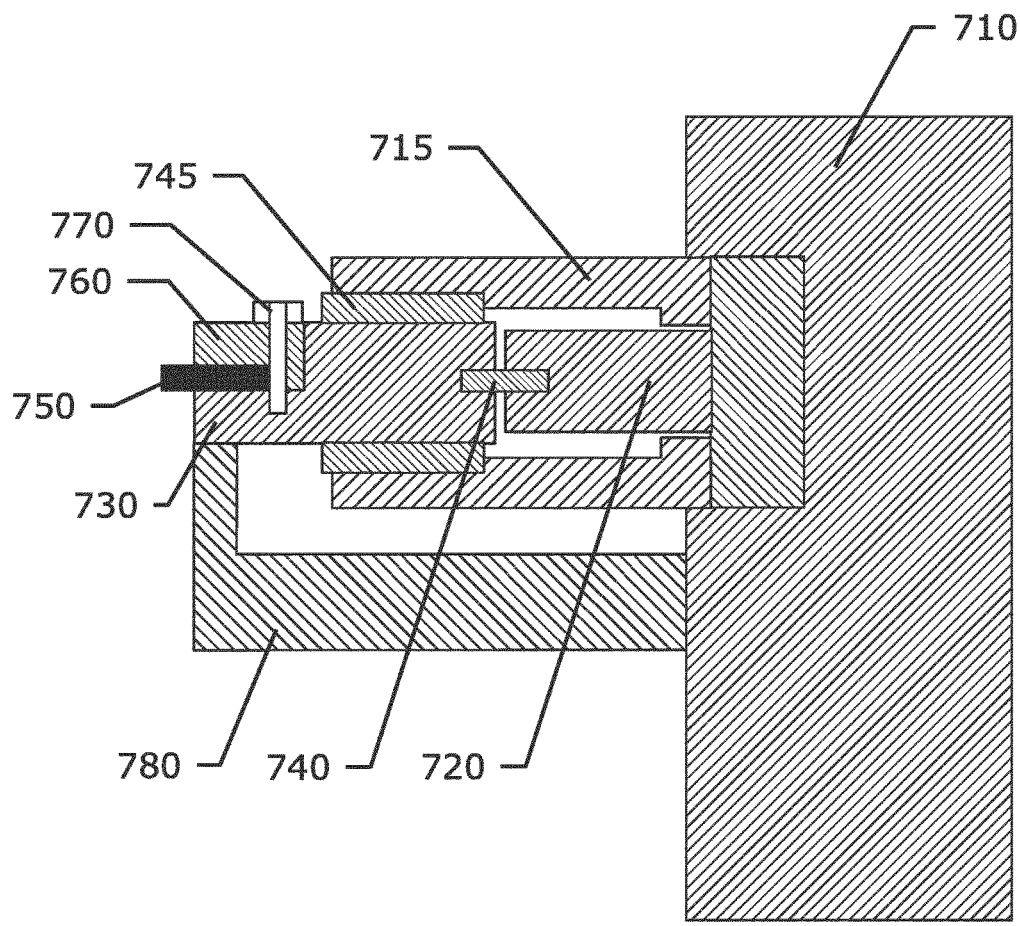
FIG. 7 shows an exemplary set up for fiber machining to manufacture metal fibers of an average length of at least 6 mm and that have a cross-section that has two neighboring straight sides with an included angle of less than 90° and one or more irregularly shaped curved sides.

FIG. 7 shows an exemplary set up for fiber machining to manufacture metal fibers of an average length of at least 6 mm and that have a cross-section that has two neighboring straight sides with an included angle of less than 90° and one or more irregularly shaped curved sides. Block 710 will slide with a constant speed along the axis of the lathe (not shown in the figure). The sliding movement can be provided via a pre-tensioned ball bearing.

A housing 715 is fixed to the block 710. The housing 715 comprises a piezomotor 720.

The vibration frequency of a few thousand Hertz is synchronized via electronic means (using an appropriate controller) with the revolving speed of the lathe, via measurement of the revolving speed of the lathe. A tool holder 730 is connected via a connection 740 to the piezomotor, hence the tool holder 730 will vibrate in the bush 745 thanks to the action of the piezomotor. A chisel (cutting tool) 750 is fixed by means of a clamp 760 and a bolt 770 onto tool holder 730. A supporting piece 780 which is fixed to the block 710 is supporting the tip of the chisel 750 as it is supporting the tool holder 730 under the position of the tip of the chisel 750.

The dimensions of the cross section of the metal fibers can be determined via image analysis.

Figures 8, 9:
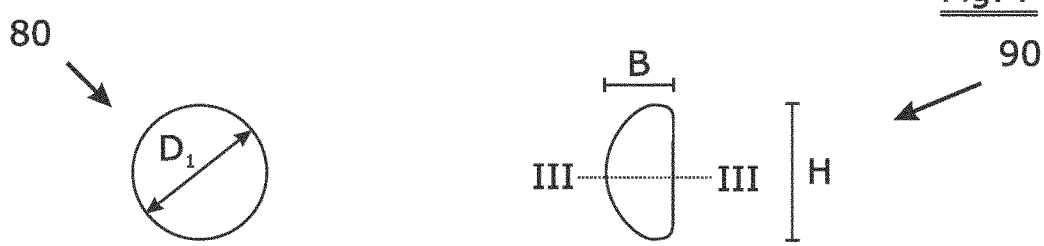
FIG. 8 shows a filter according to the invention that has a circular shape.
FIG. 9 shows a filter according to the invention that has a half moon shape.

The filter of the invention can be provided in different shapes. FIG. 8 shows a filter 80 according to the invention that has a circular surface shape with diameter D1, e.g. 80 mm. FIG. 9 shows a filter 90 according to the invention that has a half moon shape, e.g. with dimensions H 80 mm and B 40 mm. Other shapes for the filter are possible, e.g. the shapes that are known and in use for polymer filtration.

Figure 10:
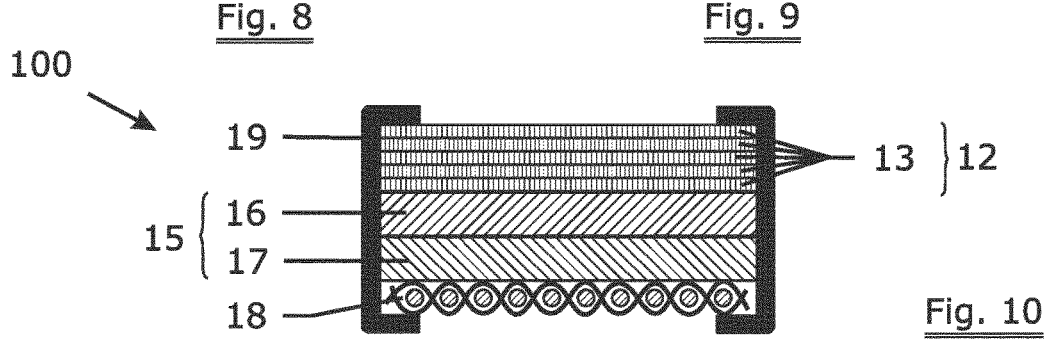
FIG. 10 shows the cross section of the filter of FIG. 8.

FIG. 10 shows the cross section of the filter of FIG. 8. The filter comprises a first layer 12 of metal fibers. The metal fibers of the first layer of metal fibers have a cross-section having two neighboring straight sides with an included angle of less than 90° and one or more irregularly shaped curved sides. The metal fibers of the first layer of metal fibers have an average length of at least 6 mm, e.g. of 8 mm. The first layer 12 has been built up by superimposing a number of webs of such metal fibers, e.g. five webs 13. It is clear however that the first layer 12 can be made by using one web or by using any other number of webs superimposed on top of each other. The metal fibers of the first layer 12 are bonded to each other by metal bonds; e.g. by means of sintering, although welding is an alternative technique that can be used, e.g. capacitive discharge welding (CDW). The filter comprises a second layer of metal fibers 15. The average equivalent diameter of the metal fibers of the second layer 15 is smaller than the average equivalent diameter of the metal fibers of the first layer 12. In the example, the second layer 15 comprises two sub-layers 16, 17. The metal fibers of the two sub-layers differ in average equivalent diameter 16, 17. The sub-layer 16 closest to the first layer 12 of metal fibers comprises metal fibers of higher average equivalent diameter than the sub-layer 17 further away from the first layer of metal fibers.

The filter comprises a metal wire mesh 18. Although not necessarily, the first layer 12, the second layer 15 and the metal wire mesh 18 can be bonded to each other by metal bonds; e.g. by means of sintering, although welding is an alternative technique that can be used to create metal bonds, e.g. capacitive discharge welding (CDW).

The filter circumference can be surrounded by a metal clamping element 19 (e.g. out of aluminum or aluminum alloy) sealing the sides of the filter and clamping the second layer 15 of metal fibers onto the first layer 12 of metal fibers.

In order to make filters with the size as in FIG. 8 or 9 a porous panel has been made of size 1.5 m by 1 m out of which a multiple number of filters as shown in FIGS. 8 and 9 can be made by means of punching out the correct size of the required filter.

A first layer of 3000 g/m² of stainless steel fibers of average equivalent diameter of 35 µm with a cross-section having two neighboring straight sides with an included angle of less than 90° and one or more irregularly shaped curved sides, with an average length of 8 mm and with a standard deviation between fibers of the equivalent fiber diameter of 18.1% of the equivalent fiber diameter is provided. The first layer can e.g. be built up by superimposing 5 webs of 600 g/m² each. The webs have been made by means of a dry-laid nonwoven production process wherein panels of 1.2 m by 1.5 m have been made. It is also possible to manufacture rolls of web. The panels are put on top of each other to build the first layer of stainless steel fibers. As an alternative to dry-laid nonwovens, wet laid webs can be used, or any other technology to make a stainless steel fiber nonwoven web.

In the first layer, instead of fibers of 35 µm equivalent diameter, fibers of other equivalent fiber diameters can be used, e.g. 22 µm, 12 µm or 8 µm; e.g. in AISI 316 steel grade.

A second layer of stainless steel fibers is provided. The second layer comprises two sub-layers.

The sub-layer that will be closest to the first layer of stainless steel fibers comprises 450 g/m² of stainless steel fibers of 22 µm equivalent diameter and the sub-layer that will be positioned further away from the first layer of stainless steel fibers comprises 900 g/m² stainless steel fiber of 12 µm equivalent diameter. Both sub-layers comprise bundle drawn stainless steel fibers and thus fibers of hexagonal cross section.

Each of the sub-layers has been made by means of carding, wherein panels of 1.2 m by 1.5 m have been made. It is also possible to manufacture rolls of web. The panels for the sub-layers have been superimposed in the correct order on the first layer.

A woven stainless steel wire mesh, a K-mesh, has been provided and put on top of the second layer. This way, a porous panel is built up.

After putting all the layers on top of each other, the porous panel was bonded by means of sintering in a sinter oven in order to obtain a panel of size 1.5 m by 1 m according to the invention. Alternatively the panel can be bonded by means of capacitive discharge welding, welding the stainless steel fibers to each other and to the woven wire mesh at cross over contacting points.

The obtained porous panel—and also the filters punched out of it—had a thickness of 1.75 mm, a weight of 5650 g/m$^2$, a porosity of 59.8%, an air permeability of 42.4 litre/(dm$^2$*min) as measured at a differential pressure of 200 Pa and according to ISO4022; and a bubble point pressure of 2240 Pa, as measured according to ASTM E128-61. Tests have shown that the filters provided excellent shearing results.

As an alternative to make the porous panel via superimposing and sintering panels of a certain size, e.g. 1.5 m by 1 m; it is also possible to unwind metal fiber web layers from rolls, and superimpose them—together with the an appropriate mesh layer if required—in order to make a porous panel that can be sintered.

Alternatively, it is also possible to unwind metal fiber web layers from rolls, and superimpose them—together with the appropriate mesh layer if required—in order to make the porous panel. If such porous panel is made in continuous length, continuous sintering or welding (e.g. capacity discharge welding) is possible in order to bond the superimposed layer. After bonding, the porous panel can be cut to a size to enable its transport, e.g. to a panel size of e.g. 1.5 m by 1 m.

Another example of a filter according to the invention comprises a first layer of 675 g/m$^2$ of stainless steel fibers of average equivalent diameter of 8 μm with a cross-section having two neighboring straight sides with an included angle of less than 90° and one or more irregularly shaped curved sides and a length of 10 mm. The filter comprises a second layer of stainless steel fibers, comprising a sub-layer of 300 g/m$^2$ of stainless steel fibers with hexagonal cross section (made via bundled drawing) of average equivalent diameter 8 μm; a sub-layer of 150 g/m$^2$ of stainless steel fibers with hexagonal cross section (made via bundled drawing) of average equivalent diameter 6.5 μm; and a sub-layer of 300 g/m$^2$ of stainless steel fibers with hexagonal cross section (made via bundled drawing) of average equivalent diameter 4 μm The filter can comprise a steel wire mesh. The first layer of stainless steel fibers, the second layer of stainless steel fibers and the mesh—if present—are bonded by means of sintering. Such a filter composition is especially suited for gel shearing and filtration of molten polymers using leaf disk in polymer film extrusion.

Another example of a filter according to the invention comprises a first layer of stainless steel fibers of 1200 g/m$^2$, comprising a first sub-layer of 900 g/m$^2$ of stainless steel fibers of average equivalent diameter of 22 μm with a cross-section having two neighboring straight sides with an included angle of less than 90° and one or more irregularly shaped curved sides and an average fiber length of 10 mm; and a second sub-layer of 300 g/m$^2$ of stainless steel fibers of average equivalent diameter of 12 μm with a cross-section having two neighboring straight sides with an included angle of less than 90° and one or more irregularly shaped curved sides and an average fiber length of 10 mm. The filter comprises a second layer of stainless steel fibers, comprising a sub-layer of 300 g/m$^2$ of stainless steel fibers with hexagonal cross section (made via bundled drawing) of average equivalent diameter 8 μm.

The filter can comprise a steel wire mesh. The first layer of stainless steel fibers, the second layer of stainless steel fibers and the mesh—if present—are bonded by means of sintering. Such a filter composition is especially suited for a leaf disk filter for gel shearing and filtration of molten polymers in polymer film extrusion.

Filters according to the invention that do not have a metal bond between the first layer of metal fibers and the second layer of metal fibers can be manufactured as well. The first layer of metal fibers can be made, e.g. via superimposing a number of webs, and sintering the first layer of metal fibers. The second layer of metal fibers can be made, e.g. via superimposing a number of webs, and sintering the second layer of metal fibers. Out of the first layer of metal fibers, and out of the second layer of metal fibers, the size is cut or punched required to make the filter. The cut or punched parts are put on top of each other. This assembly can e.g. be sintered to create metal bonds between the metal fibers of the first metal fiber layer and the metal fibers of the second metal fiber layer. One or more meshes can be added in this assembly, e.g. via sintering. As an alternative to sintering, metal bonds can be formed via welding, e.g. capacitive discharge welding.

When no metal bonds are created between the metal fibers of the first metal fiber layer and the metal fibers of the second metal fiber layer, the different layers of the filter (the first layer of metal fibers, the second layer of metal fibers and—if present—one or more meshes) can be combined in the filter by means of a metal clamping element surrounding the filter circumference, clamping the first layer and second layer in order to seal the sides of the filter.

The invention claimed is:

1. A filter for gel shearing and particle filtration of molten polymer; comprising
   a first layer of metal fibers of an average equivalent diameter between 8 and 65 μm;
   wherein the metal fibers of the first layer have a cross-section, wherein the cross section has two neighboring straight sides with an included angle of less than 90° and one or more irregularly shaped curved sides;
   and wherein the metal fibers of the first layer have an average length of at least 6mm;
   wherein the metal fibers of the first layer are bonded to each other by means of metal bonds; whereby the metal of the metal fibers of the first layer is the bonding agent forming the metal bonds; and
   a second layer of metal fibers; wherein the average equivalent diameter of the metal fibers of the second layer is smaller than the average equivalent diameter of the metal fibers of the first layer,
   wherein the metal fibers of the second layer of metal fibers have a hexagonal cross-sectional shape.

2. The filter as in claim 1, wherein the first layer of metal fibers and the second layer of metal fibers are positioned one on top of the other without a physicochemical bonding between the metal fibers of the first layer of metal fibers and the metal fibers of the second layer of metal fibers.

3. The filter as in claim 1, wherein the first layer of metal fibers and the second layer of metal fibers are bonded to each other by means of metal bonds; wherein the metal of the metal fibers of the first layer and of the second layer is the bonding agent forming the metal bonds.

4. The filter as in claim 3, wherein the metal bonds are sinter bonds or are welded bonds.

5. The filter as in claim 1, wherein the filter circumference is surrounded by a clamping element sealing the sides of the filter and clamping the second layer of metal fibers onto the first layer of metal fibers.

6. The filter as in claim 1, wherein the metal fibers of the first layer of metal fibers have a standard deviation between fibers of the equivalent fiber diameter of less than 25% of the equivalent fiber diameter.

7. The filter as in claim 1, wherein the filter comprises a metal wire mesh.

8. The filter as claim 1, wherein the metal fibers of the second layer of metal fibers have a cross-section, wherein the cross section has two neighboring straight sides with an included angle of less than 90° and one or more irregularly shaped curved sides.

9. The filter as in claim 1, wherein the porosity of the first layer of metal fibers is between 50% and 80%.

10. The filter as in claim 1, wherein the second layer of metal fibers comprises at least two sub-layers, wherein the metal fibers of the at least two sub-layers differ in average equivalent diameter; wherein a sub-layer closest to the first layer of metal fibers comprises metal fibers of higher average equivalent diameter than a sub-layer further away from the first layer of metal fibers.

11. A spin pack filter comprising a filter as in claim 1.

12. A leaf disk filter comprising a filter as in claim 1.

13. The leaf disk filter as in claim 12, wherein the first layer of metal fibers and the second layer of metal fibers of the filter are bonded to each other by means of metal bonds; wherein the metal of the metal fibers of the first layer and of the metal fibers of the second layer is the bonding agent forming the metal bonds.

14. A method for filtering molten polymer in polymer extrusion, comprising the steps of:
 using a filter for filtering molten polymer, wherein the filter comprises:
  a first layer of metal fibers of an average equivalent diameter between 8 and 65 µm;
  wherein the metal fibers of the first layer have a cross-section, wherein the cross section has two neighboring straight sides with an included angle of less than 90° and one or more irregularly shaped curved sides;
  and wherein the metal fibers of the first layer have an average length of at least 6 mm;
  wherein the metal fibers of the first layer are bonded to each other by means of metal bonds; whereby the metal of the metal fibers of the first layer is the bonding agent forming the metal bonds;
  a second layer of metal fibers; wherein the average equivalent diameter of the metal fibers of the second layer is smaller than the average equivalent diameter of the metal fibers of the first layer;
  wherein the metal fibers of the second layer of metal fibers have a hexagonal cross sectional shape, and
  wherein in the method, gels are broken and particles are removed from the molten polymer.

15. A method for filtering molten polymer in polymer extrusion, wherein a spin pack is used as in claim 11 for breaking gels and for removing particles from the molten polymer via filtration.

16. A method for filtering molten polymer in polymer extrusion, wherein a leaf disk filter is used as in claim 12 for breaking gels and for removing particles from the molten polymer via filtration.

* * * * *